(12) United States Patent
Aroch

(10) Patent No.: US 6,691,422 B1
(45) Date of Patent: Feb. 17, 2004

(54) PHOTOGRAPHIC CROPPING METHOD AND DEVICE

(76) Inventor: Guy Aroch, 510 Broome St. No. 3E, New York, NY (US) 10013

( * ) Notice: Subject to any disclaimer, the term of this patent is extended or adjusted under 35 U.S.C. 154(b) by 0 days.

(21) Appl. No.: 09/558,273

(22) Filed: Apr. 25, 2000

Related U.S. Application Data

(60) Provisional application No. 60/178,869, filed on Jan. 29, 2000.

(51) Int. Cl.[7] .............................................. G03D 15/00
(52) U.S. Cl. .......................... 33/476; 33/427; 33/DIG. 9
(58) Field of Search ...................... 33/1 F, 1 G, 1 K, 33/41.1, 430, 432, 434, 452, 476, 485, DIG. 9, 427

(56) References Cited

U.S. PATENT DOCUMENTS

| | | | | |
|---|---|---|---|---|
| 985,086 A | * | 2/1911 | Wilkes | 33/DIG. 9 |
| 1,662,066 A | * | 3/1928 | Krumm | 33/DIG. 9 |
| 2,342,525 A | * | 2/1944 | Berry | 33/DIG. 9 |
| 2,560,937 A | * | 7/1951 | Ens | 33/DIG. 9 |
| 2,626,467 A | * | 1/1953 | Abbott | 33/DIG. 9 |
| 2,782,513 A | * | 2/1957 | Brandt | 33/DIG. 9 |
| 3,939,564 A | * | 2/1976 | Slawinski | 33/1 K |
| 4,633,591 A | * | 1/1987 | Pikora | 33/DIG. 9 |
| 4,638,569 A | * | 1/1987 | Dove | 33/DIG. 9 |
| 4,854,049 A | * | 8/1989 | Kuhtik | 33/427 |
| 5,056,824 A | * | 10/1991 | Olson | 283/81 |
| 5,076,612 A | * | 12/1991 | Nirmel | |
| RE34,374 E | * | 9/1993 | Davidson | 33/427 |
| 5,551,160 A | * | 9/1996 | Ferris et al. | 33/452 |
| 5,635,265 A | * | 6/1997 | Potokar | 428/375 |
| 5,785,354 A | * | 7/1998 | Haas | 283/75 |
| 5,935,683 A | * | 8/1999 | Iiyama et al. | 428/364 |
| 6,217,078 B1 | * | 4/2001 | Roth et al. | 283/81 |

* cited by examiner

*Primary Examiner*—G. Bradley Bennett
(74) *Attorney, Agent, or Firm*—Dowd & Marotta LLC; Joseph F. Murphy

(57) ABSTRACT

A novel photographic cropping method and device, which may eliminate the need to cut or mark photos being cropped, is disclosed.

3 Claims, 4 Drawing Sheets

PHOTOGRAPHIC CROPPING METHOD AND DEVICE

REFERENCE TO PRIOR APPLICATION

This application claims the benefit of U.S. Provisional Application No. 60/178,869, filed on Jan. 29, 2000, (entitled: "Method and Apparatus for Cropping Photographs").

BACKGROUND OF THE INVENTION

An adjustable frame in the form of a cropping device (a.k.a. "cropper") is frequently used in the interrelated fields of advertising, photography and graphic design. Croppers for demarcating the desired portion of an image (i.e. the "crop") are well known in the art. It is worthwhile to carefully consider exactly what "cropping" is meant to accomplish, and how it may be done. Basically, "cropping" is done to extract from an image, e.g. a photo, a desired portion of that image. The process itself is referred to as the "cropping" or "framing" of the image, and the desired portion so identified to be extracted is known as the "crop" or "frame". Cropping may be accomplished in a series of steps. Generally, these are:

(1) Displaying the entire image to be cropped ("Displaying"),
(2) Selecting the desired portion ("Selection") of the image ("Selecting" the "Selection"),
(3) Indicating on the image itself, the Selection ("Indicating").

Hereinafter, the applicant will refer to the steps of Displaying, Selecting, and Indicating. It is important to understand each step, as well as the fact that it is the Indicated Selection that is the "crop". In other words, the process of cropping is not completed until the Selection has been Indicated.

Consider the steps of cropping in turn:

Firstly, Displaying. Displaying may be accomplished in any number of ways, such as by laying the image on a work surface such as a table.

Secondly, Selecting. Selecting the desired portion of the image is usually accomplished by using some sort of cropping device, or "cropper". Generally, such croppers consist of one or more relatively movable "cropping members", e.g. straight edges, often provided in right-angle portions which may be brought together to form a quadrilateral polygon, most often a rectangle, enclosing the desired portion of the image area (Selection).

Thirdly, and finally, Indicating. Indicating the Selection on the photo itself is the culmination of the cropping process. Most often this is done by marking on the photo with a writing instrument drawn alongside the cropping members, using the cropping members as a guide by which to mark the lines.

Obviously, the cropping members must be freely movable, both relative to each other and to the image, to facilitate Selecting. Yet although they must be freely movable to permit selection, the cropping members must also be capable of being fixedly secured once they have been moved to the position where they may Indicate the Selection. Moreover, since most photographs are rectangular, it is desirable that the two right-angle members be positionable in proper parallelism with each other. (While the image being cropped is herein referred to as a 'photo', it is understood that the image may comprise text, photos, graphics, cloth, or almost any type of representation expressed it a two-dimensional medium.)

Practitioners in the foregoing fields sometimes use a pair of crossed "L" shaped members, the arms of which are orthogonally positioned. These members are typically made of cardboard, or paper, in their simplest form, or of plastic or another metal in a more complex form.

There are several problems experienced with these arrangements of the prior art. These include:

First, difficulty in positioning, quickly and without mechanisms, cropping members so as to readily obtain croppings of various sizes with precise 90° angles.

Second, difficulty in having a simple means for holding the cropping members, once moved into a desired cropping position, in fixed or secured position (relative to each other and to the image being cropped.

Thirdly, difficulty in Indicating the Selection, inasmuch as commonly employed means, e.g. writing on, marking, or cutting the image have disadvantages. If the photo is marked on, line width tolerances become an issue; parallax errors (discussed elsewhere herein) may also become an issue, not to mention the fact that the photo itself is defaced. If the photo is cut, additional prints must often be made.

Fourth, the prior art does not satisfactorily allow the substantially simultaneous accomplishment of Indicating and Marking by which the photo is not defaced and which is as permanent as need be, e.g. which may be easily removed when removal is desired.

Fifth, cropping members of non-trivial thickness (e.g. height with respect to the plane of the photo) when used, necessarily form an overlying relationship with each other such that one cropping member is higher than the other, and in fact is not laying substantially flat on the photo, but is some distance above. Thus, using the overlying member as a guide for a pen or pencil, with which to draw a line, introduces a source of error. This is a source of error discussed in many other references, e.g. in Matthews U.S. Pat. No. 3,774,495, which was discussed in McGinnis U.S. Pat. No. 5,309,642. Both Matthews and McGinnis are hereby incorporated by reference. Matthews discloses a sheet material cutting device and cutting block therefor which again is in combination with a cutting board. Two perpendicular scales are provided, and one of the scales is provided with a raised portion to clear the other scale, which may lead to parallax errors in measurement. (As will be discussed elsewhere herein.) It should thus be further appreciated that the method and apparatus according to the current invention may eliminate the parallax error that is often, if not always, now associated with Indicating.

Prior art attempts at establishing and maintaining a mutually parallel and/or orthogonal relationship between cropping members have largely been mechanical in nature. Thus, the method and apparatus of the present invention eliminates the need for mechanical apparatus.

SUMMARY OF THE INVENTION

One provision of the invention is a cropping device comprising two separate L-shaped cropping members in which corresponding arms of the separate "L" shaped members are positionable in mutually orthogonal relationship without the need for additional tools or hardware.

Yet another provision of the invention is indicia displayed on the members, which cooperates to provide convenient scaling of copy, photographs and design graphics as a means to maintain and verify parallelism and orthogonality.

Still another provision of the invention is a cropping device that is simple in construction and thereby conducive to economical mass-manufacture, thus permitting its ready availability, preferably in a form which may be dispensed in bulk, e.g. as a pad of paper or box of facial tissues.

The problems associated with the prior art may be substantially overcome by the present invention.

OBJECTS OF THE INVENTION

It is an object of the present invention to provide a method and apparatus for cropping photographs.

A principal object of the invention is the provision of a cropping device that comprises a pair of "L" shaped.

It is a further object of the present invention to provide an inexpensive, disposable cropping method and apparatus that may be so inexpensively mass-produced that large quantities may be kept on hand, and the product may be thought of as disposable.

It is a further object of the present invention to provide apparatus of a thinness and form factor so as to avoid parallax error.

It is a further object of the present invention to have a low adhesion (fixing means) so as to permit the easy (1) removing, (2) re-positioning, and (3) re-adhering.

It is yet another object of the present invention to provide a cropping device which may be made small, vanishingly thin, and on a scale permitting its use with contact sheets, in which the original image may be small, as when compared with its enlargement.

Yet another object of the invention is to offer a solution to a problem to which there is no known satisfactory solution. That problem is that of the error introduced when a writing stylus, e.g. a pen, pencil, or marker, was used to Indicate the Selection by drawing the stylus against a cropping member, particularly, but not always, the overlying member. Note that the errors introduced includes at least both a type of parallax error, as discussed above, as well as a line width error associated with the thickness of the Indicating line drawn—since, however thin that line may be, it still is of non-zero thickness, and has both inside and outside dimensions with respect to the center of the photo. By effectively eliminating the step of Indicating—in a way which may be thought of at times as combining it with Selecting—the method and apparatus according to the present invention solves the aforementioned problem and problems, among others.

BRIEF DESCRIPTION OF THE DRAWINGS

FIG. 4 also depicts an unused/superfluous portion of the cropping member detached for discarding. For clarity, an indicating line (discussed below) has been illustrated only on this portion, though it should be understood that the indicating line could be anywhere on the cropping members.

DETAILED DESCRIPTION

Figure 1A:
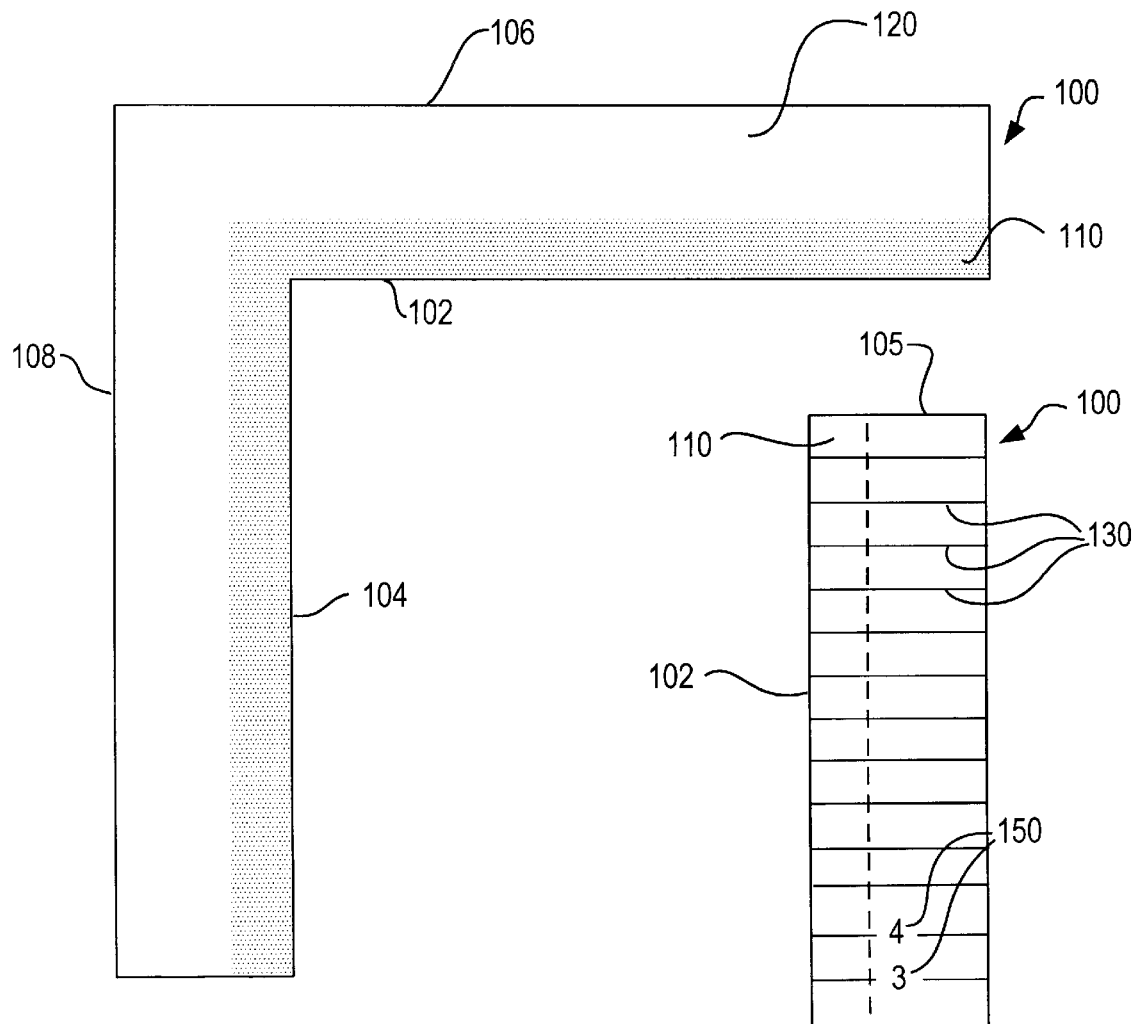
FIG. 1 is a top (1A) and a bottom (1B) plan view of a cropping member according to the present invention.
Figure 1B:
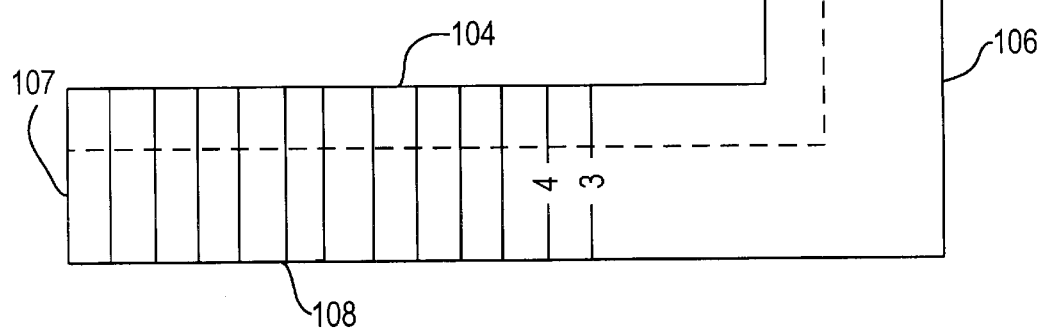

Reference is now made to FIG. 1, which shows a top plan view (FIG. 1B) and a bottom plan view (FIG. 1A) of a cropping member 100 according to the present invention.

Referring specifically to FIG. 1A, the bottom plan view, it is seen that cropping member 100 is substantially L shaped, and has an adhesive region 110 covering on the bottom of cropping member 100. While the FIG. depicts the adhesive region 110 as covering only a portion of cropping member 110, in this case the portion between an inner (proximal) side of the cropping member and an area interior thereof, it is readily seen that the adhesive area may cover any portion of the cropping member 100, and indeed may be covering its entire area. For reasons further explained herein, it is desirable that the adhesive material be characterized by high adhesion on the side adjacent to the cropping member, so as to effect permanent adherence thereto, and of low adhesion on the side which is to be applied to the photograph. For purposes of example only, this may be accomplished by using products such as the "Double Stick tapes" made by the Minnesota Mining and Manufacturing Company (3M) According to their product description available on the internet (at http://www.3m.com/adhesives/overview.jhtml;$pageID$-dst): "This broad line of tapes features pressure sensitive adhesive on front and back for bonding a wide variety of surfaces in many applications . . . 3M Double Coated Tapes are engineered with adhesive on both sides of paper, film, or tissue . . . 3M Removable/Repositionable Tapes feature a relatively "permanent" adhesive on one side of a film or tissue carrier, and a removable/repositionable adhesive on the other."

Of course, such a two-sided tape need not be used; it will be apparent that a light adhesive of the removable variety, permanently bonded to the cropping member, so as to create a surface similar to that found on the ubiquitous Post-It® brand notes manufactured by 3M in making its Post-It® brand notes These examples are given by way of illustration, not limitation, for many other adhesive means will suggest themselves to those skilled in the relevant arts. Referring specifically to FIG. 1B, the top plan view of cropping member 100, it is seen that cropping member 100 has printed and/or embossed thereon certain graduated markings 130, which may, in one embodiment, comprise perforations. Associated with said graduated markings 130 are measurement indicators 150, which may be numerical, and measured in units including but not limited to inches, centimeters, point size, etc or which may be unitless and indicate things such as print size or aspect ratio. Referring to the figures as well as the text herein, it is seen that, in accordance with the present invention, a parallel and/or orthogonal relationship between the cropping members is maintained by use of graduated markings 150 along the cropping members, and/or by aligning the members themselves.

Note that cropping member 100 readily lends itself to be written on, as when adding notes (not shown for clarity) Also, cropping member 100 while referred to herein largely as being implemented in common paper, may be implemented in a paper, cardboard, plastic, or any of a number of materials of varying thickness and opacity, such that cropping member 100 may be substantially translucent or even transparent.

Referring now to FIG. 1B, note that the perimeter of cropping member 100 is defined (with respect to the photo to be cropped) by proximal sides 102 and 104, distal sides 106 and 108, and ending edges 105 and 107. For clarity herein, proximal side 104, distal side 108, and ending edge 105 will be shown disposed in a vertical direction, while proximal side 102, distal side 106, and ending edge 107 will be shown disposed in a horizontal direction. However, it is readily apparent and should be understood that these orientations are arbitrary and mainly for ease of description and understanding; many variations thereon are possible and are to be considered within the scope of the disclosed and claimed invention.

Figure 2:
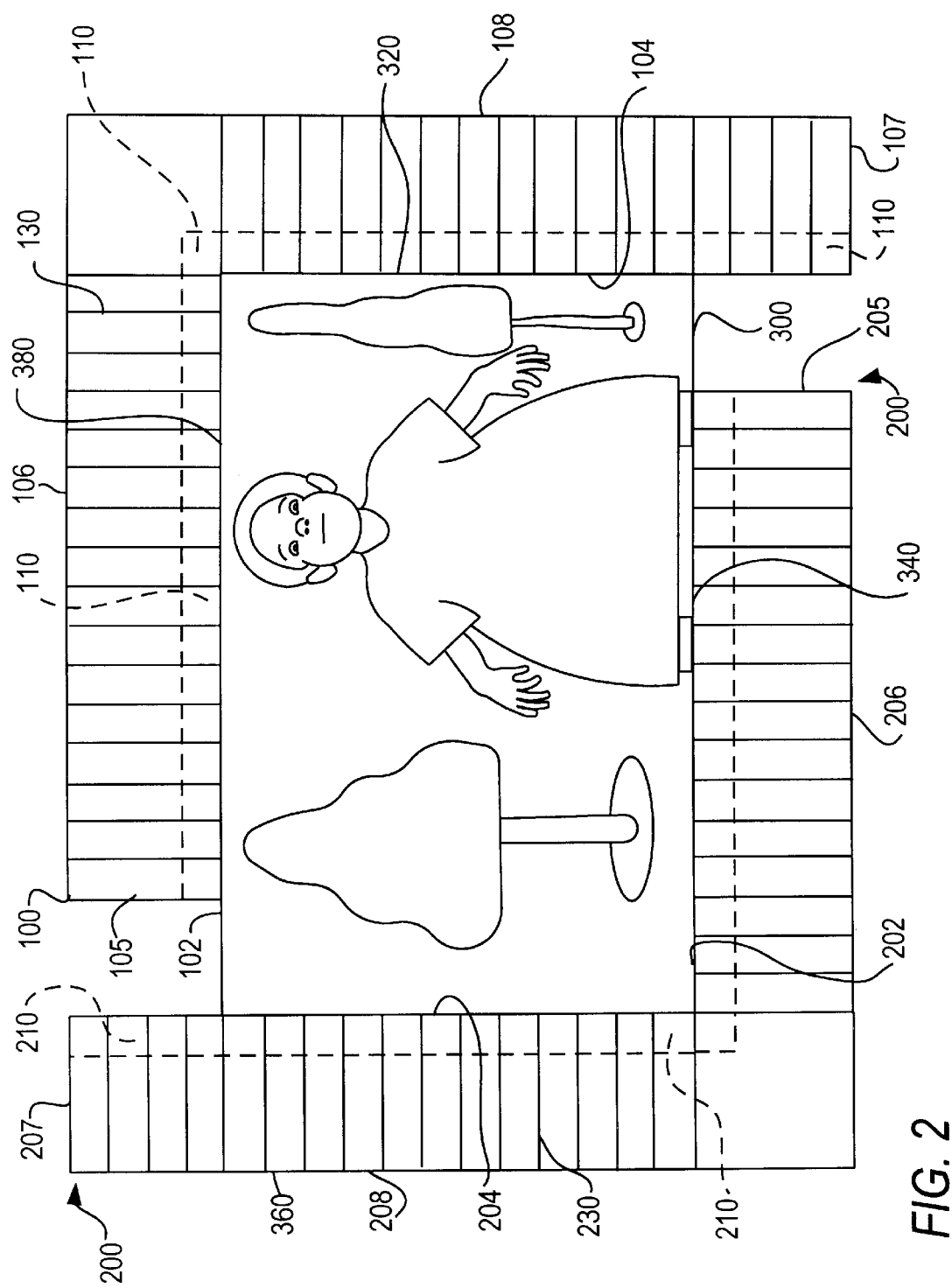
FIG. 2 is shows two cropping members of the type depicted in FIG. 1, the cropping members being positioned proximate to the photo to be cropped in a preparatory position.

With further reference to FIG. 2, note that orthogonally positioned with respect to cropping member 100 is substantially identical to cropping member 200. The perimeter of cropping member 200 is defined (with respect to the photo to be cropped) by proximal sides 202 and 204, distal sides 206 and 208, and ending edges 205 and 207 For clarity herein, proximal side 204, distal side 208, and ending edge 205 will be shown disposed in a vertical direction, while proximal side 202, distal side 206, and ending edge 207 will be shown disposed in a horizontal direction. Also shown in FIG. 2 is photograph 300, which is defined by top border 380, bottom border 340, left border 360 and right border 320. In FIG. 2 the full extent of photo 300 is visible, with cropping member 100 and cropping member 200 being positioned contiguously to photo 300, as would often be the case prior to commencing cropping. Note that at this position photo 300 top border 380 is essentially defined by proximal side 102, bottom border 340 by proximal side 202, left border 360 by proximal side 204, and right border 320 by proximal side 104. As will be seen herein, cropping will be accomplished by maintaining the parallel disposition of vertically disposed proximal sides 104 and 204, and by simultaneously maintaining the parallel disposition of horizontally disposed proximal sides 102 and 202, while moving the cropping members 100 and 200 closer together.

Figure 3:
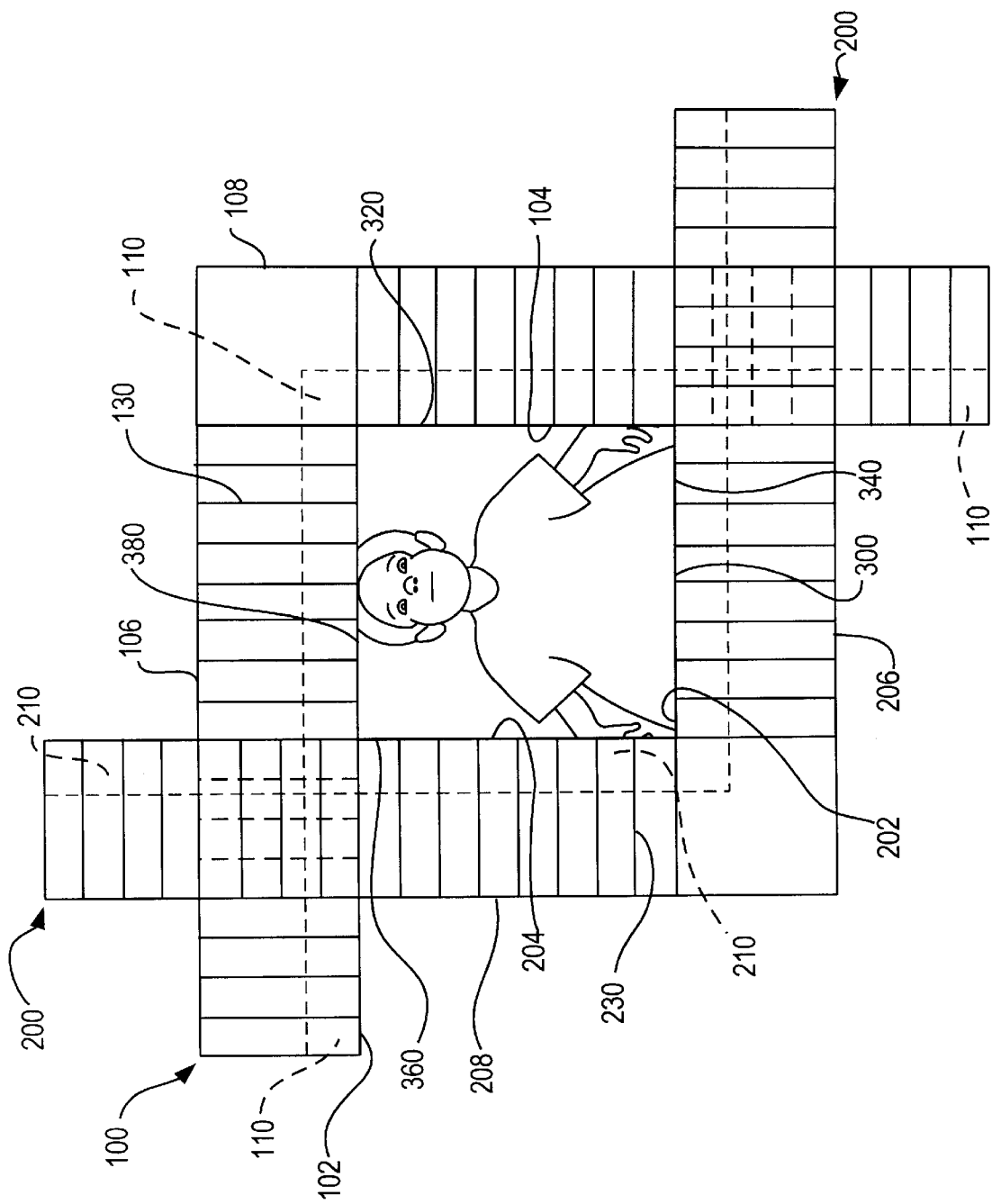
FIG. 3 shows the view of FIG. 2 wherein the cropping members have been brought closer together in Selecting.

Referring now to FIG. 3, note that cropping member 100 and cropping member 200 have been brought closer together, (each arm overlying or underlying another), while being maintained in a mutually orthogonal relationship, with the aid of graduated markings 130.

Figure 4:
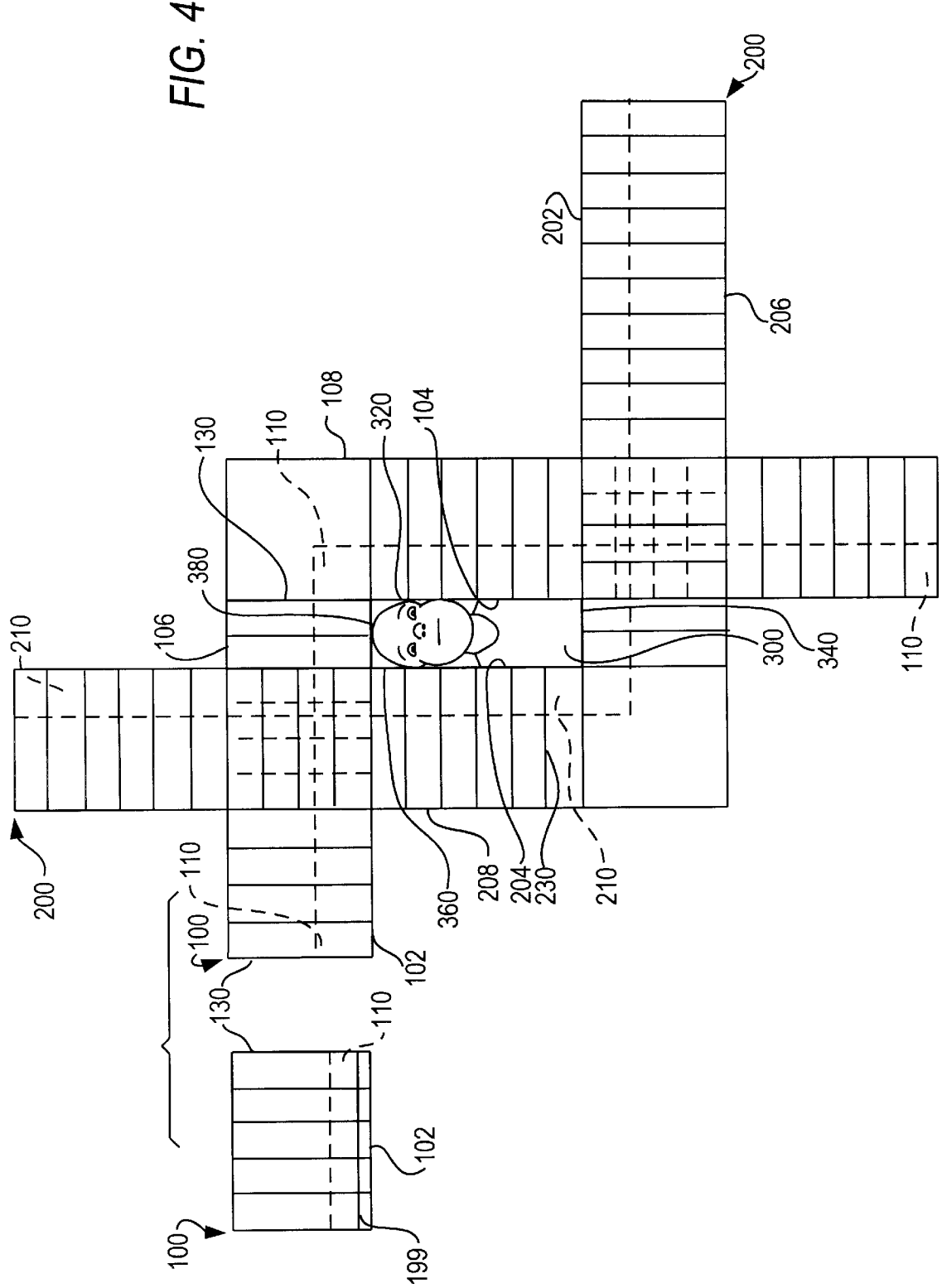
FIG. 4 shows the cropping members as depicted in FIG. 3, but where the cropping members have been brought even closer together so as to enclose the Selection. Note that in FIG. 4 the cropping members have been pressed down against the photo so as to adhere to the photo, thus Indicating the Selection, and thereby completing the cropping process.

Referring now to FIG. 4.: Note that graduated markings 130 and 230 are seen to facilitate and enable cropping members 100 and 200 to be orthogonally positionable, as the graduated markings on each arm of the cropping members are parallel with the overlying (underlying) side of the other cropping member, and perpendicular with the graduated markings on the overlying (underlying) side of the other cropping member.

Note that the photo in FIG. 4, with the device according to the present invention affixed thereto, is not only Selected, but is also Indicated. This is because the cropping members 100 and 200 are affixed to each other and to the photo, and effectively function to Indicate the Selection. Thus cropping is finished.

Note that region 110 could be substantially clear, or with an indicating line 199 a short distance from the edge 102. Such would be useful; for example, in being able to visually verify and accomplish cropping with respect to the "registration marks" typically used in the relevant arts.

Several embodiments of the present invention are specifically illustrated and described herein. However, it will be appreciated that modifications and variations of the present invention are covered by the above teachings and are within the scope of the appended claims without departing from the spirit and intended scope of the invention.

I claim:

1. A device for cropping a photograph, said device comprising:
   a first cropping member having a first and a second side,
   an adhesive region upon said first side of said first cropping member,
   wherein said adhesive region has two sides, a first adhesive region side which is characterized by high adhesion and which is adhered to said first side of said first cropping member, and a second adhesive region side which is characterized by low adhesion.

2. A device for cropping a photograph, said device comprising:
   a first cropping member having a first and a second side;
   a second cropping member having a first and a second side;
   an adhesive region upon at least one of said first cropping member or said second cropping member,
   wherein said adhesive region has two sides, a first adhesive region side which is characterized by high adhesion and which is adhered to said first side of said at least one of said first cropping member or said second cropping member, and a second adhesive region side which is characterized by low adhesion.

3. A device for cropping a photograph, said device comprising:
   a first cropping member having a first and a second side,
   an adhesive region upon said first cropping member, wherein said adhesive region upon said first cropping member has two sides, a first adhesive region side which is characterized by high adhesion and which is adhered to said first side of said first cropping member, and a second adhesive region side which is characterized by low adhesion;
   a second cropping member having a first and a second side,
   an adhesive region upon said second cropping member, wherein said adhesive region upon said second cropping member has two sides, a first adhesive region side which is characterized by high adhesion and which is adhered to said first side of said second cropping member, and a second adhesive region side which is characterized by low adhesion.

* * * * *